(12) United States Patent
Kanbe et al.

(10) Patent No.: US 9,007,880 B2
(45) Date of Patent: Apr. 14, 2015

(54) THERMALLY ASSISTED MAGNETIC RECORDING MEDIUM AND MAGNETIC RECORDING AND REPRODUCING APPARATUS

(71) Applicant: Showa Denko K.K., Minato-ku, Tokyo (JP)

(72) Inventors: Tetsuya Kanbe, Ichihara (JP); Kazuya Niwa, Ichihara (JP); Yuji Murakami, Ichihara (JP); Lei Zhang, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 14/385,840

(22) PCT Filed: Apr. 30, 2013

(86) PCT No.: PCT/JP2013/062609
§ 371 (c)(1),
(2) Date: Sep. 17, 2014

(87) PCT Pub. No.: WO2013/165002
PCT Pub. Date: Nov. 7, 2013

(65) Prior Publication Data
US 2015/0049594 A1    Feb. 19, 2015

(30) Foreign Application Priority Data

May 1, 2012    (JP) ................. 2012-104566

(51) Int. Cl.
*G11B 11/00* (2006.01)
*G11B 5/82* (2006.01)
(Continued)

(52) U.S. Cl.
CPC    *G11B 5/738* (2013.01); *G11B 5/09* (2013.01); *G11B 5/4866* (2013.01); *G11B 2005/0021* (2013.01)

(58) Field of Classification Search
CPC ........... G11B 2005/0021; G11B 5/314; G11B 11/0584; G11B 11/0554; G11B 11/058; G11B 5/82; G11B 5/743; G11B 5/84
USPC ......... 360/135; 369/13.33, 13.13, 13.38, 288; 428/846, 831, 829, 831.1, 694 T
See application file for complete search history.

(56) References Cited

U.S. PATENT DOCUMENTS 6,916,530 B2 *    7/2005    Koujima et al. ............. 428/336
7,829,208 B2    11/2010    Peng et al.

FOREIGN PATENT DOCUMENTS

| JP | 6-259743 A | 9/1994 |
| JP | 11-353648 A | 12/1999 |

(Continued)

OTHER PUBLICATIONS

Ikuya Tagawa, et al., "Relationship Between High Density Recording Performance and Particle Coercivity Distribution", IEEE Transactions on Magnetics, Nov. 1991, pp. 4975-4977, vol. 27, No. 6.

(Continued)

*Primary Examiner* — Nabil Hindi
(74) *Attorney, Agent, or Firm* — Sughrue Mion, PLLC

(57) ABSTRACT

A thermally assisted magnetic recording medium (1) includes a substrate (101), an underlayer (3) that is formed above the substrate (101), and a magnetic layer (107) that is formed on the underlayer (3) and contains an alloy having an $L1_0$ structure as a main component. The underlayer (3) is formed by continuously laminating a first underlayer (104) having a BCC structure with a lattice constant that is 0.302 to 0.332 nm, a second underlayer (105) that has a NaCl structure including C, and a third underlayer (106) that is composed of MgO.

7 Claims, 3 Drawing Sheets

(51) Int. Cl.
  *G11B 5/706* (2006.01)
  *G11B 5/738* (2006.01)
  *G11B 5/09* (2006.01)
  *G11B 5/48* (2006.01)
  *G11B 5/00* (2006.01)

(56) References Cited

FOREIGN PATENT DOCUMENTS

| JP | 2002-25032 A | 1/2002 |
| JP | 2002-208129 A | 7/2002 |
| JP | 2004-178753 A | 6/2004 |
| JP | 2009-146558 A | 7/2009 |
| JP | 2009-158054 A | 7/2009 |
| JP | 2011-198455 A | 10/2011 |
| JP | 2012-014750 A | 1/2012 |
| JP | 2012-160243 A | 8/2012 |
| JP | 2012-169017 A | 9/2012 |
| JP | 2012-221544 A | 11/2012 |

OTHER PUBLICATIONS

International Search Report of PCT/JP2013/062609, dated Jul. 16, 2013. [PCT/ISA/210].

* cited by examiner

THERMALLY ASSISTED MAGNETIC RECORDING MEDIUM AND MAGNETIC RECORDING AND REPRODUCING APPARATUS

CROSS REFERENCE TO RELATED APPLICATIONS

This application is a National Stage of International Application No. PCT/JP2013/062609 filed Apr. 30, 2013, claiming priority based on Japanese Patent Application No. 2012-104566, filed May 1, 2012, the contents of all of which are incorporated herein by reference in their entirety.

BACKGROUND OF THE INVENTION

1. Field of the Invention

The present invention relates to a thermally assisted magnetic recording medium that is used in, for example, a hard disk drive (HDD) and a magnetic recording and reproducing apparatus.

2. Description of Related Art

In recent years, there has been an increasing demand for hard disk drives (HDD) with high capacity. As means for meeting the demand, a thermally assisted recording method has been proposed in which a magnetic head provided with a laser light source heats a magnetic recording medium to perform recording. The thermally assisted recording method heats the magnetic recording medium to significantly reduce coercive force. Therefore, a magnetic layer of the magnetic recording medium can be made of a material with a large crystal magnetic anisotropic constant Ku. As a result, it is possible to reduce a magnetic grain size while maintaining thermal stability and to achieve a surface density of about 1 Tbit/inch$^2$.

An ordered alloy, such as an $L1_0$ FePt alloy, an $L1_0$ CoPt alloy, or an $L1_1$ CoPt alloy has been known as the magnetic material with a large crystal magnetic anisotropic constant Ku. In addition, an oxide, such as $SiO_2$ or $TiO_2$, C, or BN is added as a grain boundary layer material to the magnetic layer in order to divide crystal grains made of the ordered alloy. When the magnetic layer of the magnetic recording medium has a granular structure in which magnetic crystal grains are separated in a grain boundary phase, it is possible to reduce the exchange coupling between the magnetic grains and to achieve a high signal-to-noise ratio (SNR).

An $L1_0$ ordered alloy in the magnetic layer needs to have a high (001) orientation in order to obtain a thermally assisted recording medium with high perpendicular magnetic anisotropy. The orientation of the magnetic layer can be controlled by an underlayer. Therefore, it is necessary to provide an appropriate underlayer in order to control the orientation of the magnetic layer.

For example, Patent Document 1 discloses a technique in which a MgO underlayer is used to make an $L1_0$ FePt magnetic layer have a high (001) orientation. In addition, Patent Document 2 discloses a technique in which a MgO underlayer is formed on an underlayer made of an alloy with a BCC structure, such as a CrTiB alloy, to make an $L1_0$ FePt magnetic layer have a high (001) orientation. Furthermore, Patent Document 3 and Patent Document 4 disclose a technique in which an $L1_0$ FePt magnetic layer is formed on an underlayer made of an alloy with a NaCl structure, such as TiN or CrN, to have a high (001) orientation.

PRIOR ART DOCUMENTS

Patent Documents

[Patent Document 1] Japanese Unexamined Patent Application, First Publication No. H11-353648
[Patent Document 2] Japanese Unexamined Patent Application, First Publication No. 2009-158054
[Patent Document 3] Japanese Unexamined Patent Application, First Publication No. 2009-146558
[Patent Document 4] U.S. Pat. No. 7,829,208-B2

SUMMARY OF THE INVENTION

However, the thermally assisted recording medium according to the related art needs to include a magnetic layer that has a high (001) orientation when it has, as a main component, an alloy with an $L1_0$ structure, which is a material with a large crystal magnetic anisotropic constant Ku, and needs to have a high coercive force, a narrow switching field distribution, and a high SNR.

The invention has been made in view of the above-mentioned problems of the related art and an object of the invention is to provide a thermally assisted recording medium that includes a magnetic layer with a high (001) orientation and has a high coercive force, a narrow switching field distribution, and a high SNR.

Another object of the invention is to provide a magnetic recording and reproducing apparatus that includes the thermally assisted recording medium according to the invention and has a low error rate and high reliability.

Solution to Problem

The orientation and magnetic characteristics of the magnetic layer in the thermally assisted recording medium can be controlled by the underlayer which is formed beneath the magnetic layer. Therefore, the inventors made a thorough study on the underlayer in order to solve the above-mentioned problems.

The inventors found that it was possible to solve the above-mentioned problems using a thermally assisted magnetic recording medium having the following structure: the thermally assisted magnetic recording medium including a substrate, an underlayer that was formed above the substrate, and a magnetic layer that was formed on the underlayer and had an alloy with an $L1_0$ structure as a main component; and the underlayer was formed by continuously laminating a first underlayer having a BCC structure with a lattice constant that was 0.302 to 0.332 nm, a second underlayer that had a NaCl structure including C, and a third underlayer that was made of MgO. As a result, the inventors achieved the invention. That is, the invention relates to the following.

(1) A thermally assisted magnetic recording medium includes a substrate, an underlayer that is formed above the substrate, and a magnetic layer that is formed on the underlayer and contains an alloy having an $L1_0$ structure as a main component. The underlayer is formed by continuously laminating a first underlayer having a BCC structure with a lattice constant that is 0.302 to 0.332 nm, a second underlayer that has a NaCl structure including C, and a third underlayer that is composed of MgO.

(2) In the thermally assisted magnetic recording medium according to (1), the first underlayer may include at least one of Mo, W, Nb, or Ta.

(3) In the thermally assisted magnetic recording medium according to (1), the first underlayer may be composed of one material selected from a group consisting of Mo, W, Nb, and Ta.

(4) In the thermally assisted magnetic recording medium according to any one of (1) to (3), the second underlayer may be composed of one material selected from a group consisting of TaC, NbC, ZrC, and HfC.

(5) In the thermally assisted magnetic recording medium according to any one of (1) to (3), the second underlayer may be composed of TaC or NbC.

(6) In the thermally assisted magnetic recording medium according to any one of (1) to (5), the magnetic layer may have a FePt or CoPt alloy having the $L1_0$ structure as a main component and include at least one material selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$ and BN.

(7) A magnetic recording and reproducing apparatus includes the thermally assisted magnetic recording medium according to any one of (1) to (6), a medium driving unit that drives the magnetic recording medium in a recording direction, a magnetic head that includes a laser generation unit configured to heat the magnetic recording medium and a waveguide configured to guide a laser beam generated from the laser generation unit to a leading end, and performs a recording operation and a reproducing operation on the magnetic recording medium, a head moving unit that moves the magnetic head relative to the magnetic recording medium, and a recording and reproducing signal processing system that inputs a signal to the magnetic head and reproduces a signal output from the magnetic head.

A thermally assisted magnetic recording medium according to the invention includes a magnetic layer that is formed on an underlayer and has an alloy with an $L1_0$ structure as a main component. The underlayer is formed by continuously laminating a first underlayer having a BCC structure with a lattice constant that is 0.302 to 0.332 nm, a second underlayer that has a NaCl structure including C, and a third underlayer that is made of MgO. Therefore, the magnetic layer has a high (001) orientation and the thermally assisted magnetic recording medium has a high coercive force, a narrow switching field distribution, and a high SNR.

In addition, a magnetic recording and reproducing apparatus according to the invention includes the thermally assisted magnetic recording medium according to the invention. Therefore, the magnetic recording and reproducing apparatus has a low error rate and high reliability.

DETAILED DESCRIPTION OF THE INVENTION

Hereinafter, embodiments of the invention will be described in detail with reference to the drawings. The invention is not limited to the following embodiments.

[Thermally Assisted Magnetic Recording Medium]

Figure 1:
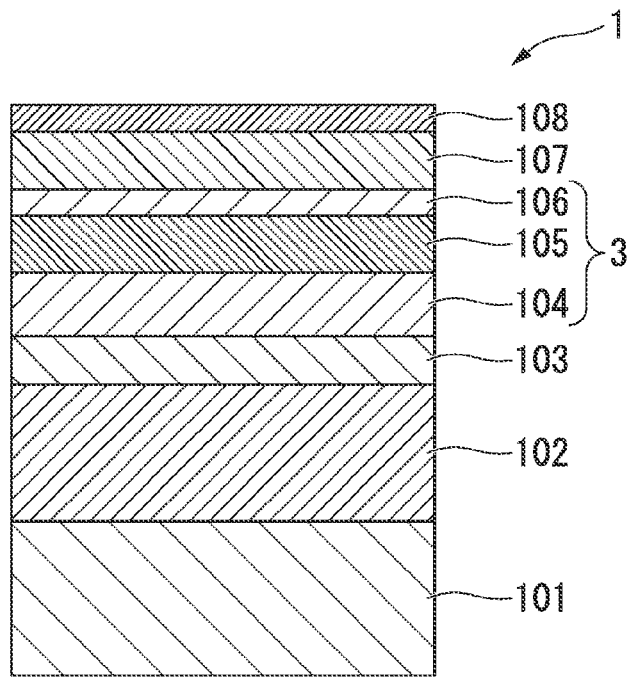
FIG. 1 is a cross-sectional view illustrating an example of a thermally assisted magnetic recording medium according to the invention.

FIG. 1 is a cross-sectional view illustrating an example of a thermally assisted magnetic recording medium according to the invention. A thermally assisted magnetic recording medium 1 (hereinafter, referred to as a "magnetic recording medium" in some cases) shown in FIG. 1 is formed by sequentially laminating a seed layer 102, an orientation control layer 103, an underlayer 3, a magnetic layer 107, and a protective film 108 on a substrate 101 in this order. As shown in FIG. 1, the underlayer 3 is formed by continuously laminating a first underlayer 104, a second underlayer 105, and a third underlayer 106 on the side of the substrate 101. The magnetic layer 107 is provided on the third underlayer 106 of the underlayer 3.

"Substrate"

A heat-resistant glass substrate with an amorphous structure or a microcrystalline structure can be used as the substrate 101. In the magnetic recording medium 1 according to this embodiment, in some cases, when the magnetic layer 107 is formed, the substrate 101 is heated at a temperature of 400° C. or more. Therefore, the substrate 101 is preferably made of a material with a glass transition temperature of 400° C. or more and preferably 600° C. or more.

"Seed Layer"

The seed layer 102 controls the crystal grain size of the magnetic layer 107. The seed layer 102 may be made of an amorphous material. For example, the material forming the seed layer 102 can be an alloy, such as Cr-50 at % Ti, Ni-40 at % Ta, or Ti-50 at % Al, but is not limited thereto.

"Orientation Control Layer"

The orientation control layer 103 makes the first underlayer 104 have a high (100) orientation and controls the orientation of the second underlayer 105 and the third underlayer 106 of the underlayer 3 to improve the performance of the underlayer 3 controlling the orientation of the magnetic layer 107. Preferably, a (100)-oriented layer with a B2 structure or a BCC structure is used as the orientation control layer 103.

For example, the (100)-oriented orientation control layer 103 with the B2 structure is composed of NiAl or RuAl. The orientation control layer 103 with the B2 structure is formed on, for example, the amorphous seed layer 102 at a high temperature of 200° C. or more to have the (100) orientation.

In addition, the (100)-oriented orientation control layer 103 with the BCC structure is composed of, for example, Cr or an alloy having Cr as a main component. Examples of the alloy having Cr as the main component include CrMn, CrMo, CrW, CrV, CrTi, and CrRu.

In particular, when the first underlayer 104 is made of an alloy having a BCC structure with a large lattice constant, it is preferable that the orientation control layer 103 be made of a Cr alloy with a large lattice constant which is obtained by adding an element with a large atomic radius, such as Mo or W, to Cr. However, when an excessively large amount of an element with a large atomic radius is added to the Cr alloy, there is a concern that the (100) orientation of the orientation control layer 103 made of the Cr alloy will deteriorate. Therefore, it is preferable that the amount of elements other than Cr in the alloy which has Cr as the main component and is used to form the orientation control layer 103 be equal to or less than about 30 at %.

Similarly to the orientation control layer 103 with the B2 structure, the orientation control layer 103 with the BCC structure is formed on, for example, the amorphous seed layer 102 at a high temperature of 200° C. or more to have the (100) orientation.

"First Underlayer"

The first underlayer 104 has the BCC structure with a lattice constant that is equal to or greater than 0.302 nm and equal to or less than 0.332 nm (0.302 to 0.332 nm). It is preferable that the lattice constant of the first underlayer 104 be equal to or greater than 0.31 nm and equal to or less than 0.32 nm.

The first underlayer 104 shown in FIG. 1 is formed on the orientation control layer 103 and has a high (100) orientation. Since the first underlayer 104 has the high (100) orientation, the second underlayer 105 can have the (100) orientation.

In the magnetic recording medium 1 according to this embodiment, the lattice constant of the first underlayer 104 is equal to or greater than 0.302 nm and equal to or less than 0.332 nm in order to reduce the lattice misfit between the first underlayer 104 and the layers (the orientation control layer 103 and the second underlayer 105 in the magnetic recording medium 1 shown in FIG. 1) which are provided on and beneath the first underlayer 104.

When the lattice constant of the first underlayer 104 is less than 0.302 nm, the lattice misfit between the first underlayer 104 and the second underlayer 105 having a NaCl structure including C is equal to or greater than 10% and it is difficult for the second underlayer 105 to have a high (100) orientation. When the lattice constant of the first underlayer 104 is greater than 0.332 nm, the lattice misfit between the first underlayer 104 and the layer (the orientation control layer 103 in the magnetic recording medium 1 shown in FIG. 1) which is provided on the side of the first underlayer 104 close to the substrate 101 increases. As a result, the first underlayer 104 does not have a high (100) orientation and the performance of the underlayer 3 controlling the orientation of the magnetic layer 107 is likely to deteriorate.

Any layer, that has the BCC structure with a lattice constant that is equal to or greater than 0.302 nm and equal to or less than 0.332 nm, may be used as the first underlayer 104. It is preferable that the first underlayer 104 be made of one element selected from Mo, W, Nb, and Ta with a lattice constant that is equal to or greater than 0.302 nm and equal to or less than 0.332 nm.

In addition, the first underlayer 104 may be made of an alloy including at least one of elements selected from Mo, W, Nb, and Ta. Specifically, examples of the alloy include MoCr, MoV, MoW, MoTa, MoNb, WCr, WV, WTa, WNb, TaCr, TaV, TaNb, NbCr, and NbV. When the above-mentioned alloy is used as the material forming the first underlayer 104, the content of other elements added to Mo, W, Nb, and Ta is in the range in which the lattice constant of the first underlayer 104 is equal to or greater than 0.302 nm and equal to or less than 0.332 nm and the BCC structure does not deteriorate.

"Second Underlayer"

The second underlayer 105 has the NaCl structure including C. It is preferable that the second underlayer 105 be composed of TaC, NbC, ZrC, or HfC. The second underlayer 105 made of the above-mentioned material has a small difference in lattice constant from the first underlayer 104 and the third underlayer 106. Therefore, when the second underlayer 105 is made of the above-mentioned material, the degree of order of an alloy with an $L1_0$ structure in the magnetic layer 107 is high and the magnetic recording medium 1 with a high coercive force, a narrow switching field distribution, and high corrosion resistance is obtained.

It is preferable that the second underlayer 105 be made of TaC or NbC. When the second underlayer 105 is made of TaC, it is possible to particularly reduce the switching field distribution. A high medium SNR and high corrosion resistance are obtained. When the second underlayer 105 is made of NbC, a high coercive force is obtained and the magnetic layer 107 with a high regularity is obtained.

When the second underlayer 105 is made of ZrC, a high coercive force is obtained and the magnetic layer 107 with a high degree of order is obtained. High overwriting characteristics are obtained.

The lattice constants of TaC, NbC, ZrC, and HfC are shown in Table 1.

TABLE 1

| Second underlayer | Crystal structure | Lattice constant (nm) |
|---|---|---|
| ZrC | NaCl | 0.469 |
| HfC | NaCl | 0.464 |
| TaC | NaCl | 0.445 |
| NbC | NaCl | 0.446 |

In this embodiment, since the lattice constant of the first underlayer 104 is equal to or greater than 0.302 nm and equal to or less than 0.332 nm, the lattice misfit between the (100) plane of the first underlayer 104 and the (100) plane of the second underlayer 105 with the NaCl structure including C is equal to or less than 10%. Therefore, for example, the second underlayer 105 is epitaxially grown on the first underlayer 104 to easily obtain the second underlayer 105 having a high (100) orientation. In addition, the <110> direction of the (100) plane of the first underlayer 104 is parallel to the <100> direction of the (100) plane of the second underlayer 105. Therefore, when the lattice constant of the first underlayer 104 is $a_1$ and the lattice constant of the second underlayer 105 is $a_2$, the lattice misfit between the first underlayer 104 and the second underlayer 105 is defined as $(a_2-\sqrt{2}a_1)/(\sqrt{2}a_1)$.

"Third Underlayer"

The third underlayer 106 which is composed of MgO is formed on the second underlayer 105.

The third underlayer 106 has the NaCl structure. The third underlayer 106 can be formed by, for example, a method of epitaxially growing MgO, which will be the third underlayer 106, on the second underlayer 105.

The lattice constant of MgO is 0.421 nm and is 5% to 10% less than the lattice constant of the second underlayer 105. Therefore, when MgO which will be the third underlayer 106 is formed on the second underlayer 105, tensile stress is introduced into the surface of a MgO film which is the third underlayer 106. Therefore, tensile stress is introduced from the third underlayer 106 into the magnetic layer 107 which is formed on the third underlayer 106 and has, as a main component, an alloy with the $L1_0$ structure, such as an $L1_0$-FePt alloy, and the regularization of the magnetic layer 107 is accelerated.

It is desirable that the thickness of the MgO film which is the third underlayer 106 be equal to or greater than 0.5 nm and equal to or less than 5 nm (0.5 to 5 nm). When the thickness of the third underlayer 106 is in the above-mentioned range, MgO in the third underlayer 106 has a good NaCl structure. As a result, the third underlayer 106 can effectively control the orientation of the magnetic layer 107 and sufficient tensile stress is obtained in the surface of the MgO film. Therefore, the magnetic layer 107 with a high degree of order is obtained.

When the thickness of the third underlayer 106 is less than 0.5 nm, it is difficult for MgO in the third underlayer 106 to have a good NaCl structure and the performance of the third underlayer 106 controlling the orientation of the magnetic layer 107 deteriorates. When the thickness of the third underlayer 106 is greater than 5 nm, the tensile stress in the surface of the MgO film is reduced since the third underlayer 106 is too thick. Therefore, tensile stress is less likely to be introduced into the magnetic layer 107 and the performance of the third underlayer 106 controlling the orientation of the magnetic layer 107 deteriorates.

"Magnetic Layer"

The magnetic layer 107 has an alloy with the $L1_0$ structure as a main component. Since the underlayer 3 is arranged beneath the magnetic layer 107, the magnetic layer 107 has a high (001) orientation.

The magnetic layer 107 has, as the main component, a FePt or CoPt alloy having the $L1_0$ structure and preferably includes at least one material selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN. According to the magnetic layer 107 having the abovementioned structure, the exchange coupling between crystal grains in the alloy with the $L1_0$ structure, which is the main component of the magnetic layer 107, is broken and the crystal grains are magnetically isolated. Therefore, it is possible to reduce the noise of the magnetic recording medium 1.

When the magnetic layer 107 has a FePt alloy as the main component, it is preferable to set the temperature (regularization temperature) of the substrate 101 to 600° C. or more during the formation of the magnetic layer 107 in order to accelerate the regularization of the FePt alloy. In addition, for example, Ag, Au, Cu, and Ni may be added to the FePt alloy, which is the main component of the magnetic layer 107, in order to reduce the regularization temperature. In this case, it is possible to reduce the regularization temperature to about 400° C. to 500° C.

"Protective Film"

It is preferable to form the protective film 108 which is made of, for example, diamond like carbon (DLC) on the magnetic layer 107. The protective film 108 made of DLC can be formed by, for example, an RF-CVD method which decomposes a raw material gas made of carbon hydride using high-frequency plasma, an IBD method which ionizes a raw material gas with electrons emitted from a filament to form a film, and an FCVA which forms a film using a solid C target, without using a raw material gas.

It is preferable that the thickness of the protective film 108 be equal to or greater than 1 nm and equal to or less than 6 nm. When the thickness of the protective film 108 is less than 1 nm, the floating characteristics of the magnetic head deteriorate, which is not preferable. When the thickness of the protective film 108 is greater than 6 nm, magnetic spacing increases and the SNR is reduced, which is not preferable.

The magnetic recording medium 1 shown in FIG. 1 includes the underlayer 3 that is provided above the substrate 101 and the magnetic layer 107 that is formed on the underlayer 3 and has an alloy with the $L1_0$ structure as the main component. The underlayer 3 is formed by continuously laminating the first underlayer 104 having the BCC structure with a lattice constant that is equal to or greater than 0.302 nm and equal to or less than 0.332 nm, the second underlayer 105 that has the NaCl structure including C, and the third underlayer 106 that is made of MgO. Therefore, the magnetic layer 107 has a high (001) orientation.

Specifically, the high (100) orientation of the first underlayer 104 with the BCC structure succeeds to the second underlayer 105 with the NaCl structure which has a small lattice misfit with the first underlayer 104. Then, the second underlayer 105 has a high (100) orientation and the high (100) orientation of the second underlayer 105 succeeds to the third underlayer 106 having a small lattice misfit with the second underlayer 105. Then, the third underlayer 106 has a high (100) orientation and the orientation of the magnetic layer 107 which is formed on the third underlayer 106 is controlled by the underlayer 3 to have a high (001) orientation. As a result, the magnetic recording medium 1 shown in FIG. 1 has a high coercive force, a narrow switching field distribution, and a high SNR.

Other Examples

The invention is not limited to the magnetic recording medium 1 shown in FIG. 1.

For example, in the magnetic recording medium 1 shown in FIG. 1, the seed layer 102 and the orientation control layer 103 are arranged between the substrate 101 and the underlayer 3. When the magnetic layer 107 has a high (001) orientation even though the seed layer 102 and the orientation control layer 103 are not provided, the seed layer 102 and the orientation control layer 103 may not be provided.

It is preferable to provide the protective film 108 in order to protect the magnetic layer 107. However, the protective film 108 may not be provided.

In addition, a lubricant which is made of, for example, a perfluoropolyether-based fluorine resin may be applied onto the protective film 108.

Furthermore, for example, a soft magnetic underlayer may be provided between a substrate 101 and a seed layer 102 in order to improve the writing effect of the magnetic recording medium. The soft magnetic underlayer can be made of an amorphous alloy, such as CoTaZr, CoFeTaB, CoFeTaSi, or CoFeTaZr, a microcrystalline alloy, such as FeTaC or FeTaN, or a polycrystalline alloy, such as NiFe. The soft magnetic underlayer may be a single-layer film which is made of the above-mentioned alloy or a laminate of films which are antiferromagnetically coupled, with a Ru layer having an appropriate thickness interposed therebetween.

Figure 2:
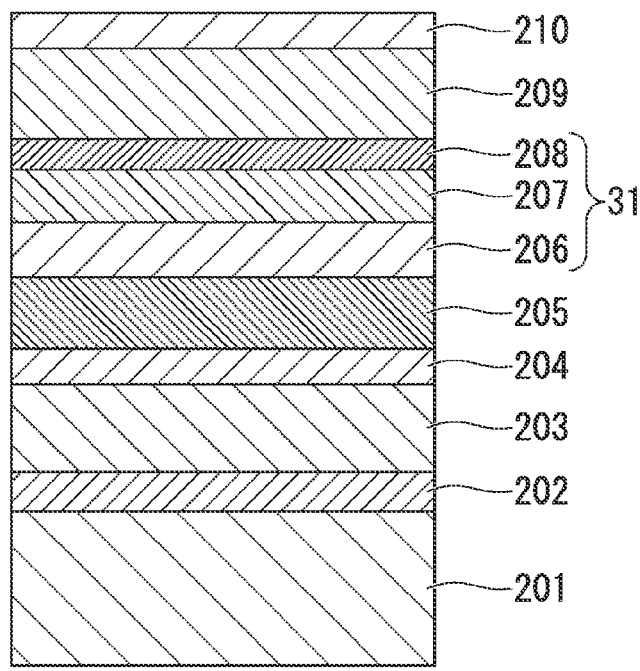
FIG. 2 is a cross-sectional view illustrating another example of the thermally assisted magnetic recording medium according to the invention.

FIG. 2 is a cross-sectional view illustrating another example of the thermally assisted magnetic recording medium according to the invention. The thermally assisted magnetic recording medium shown in FIG. 2 is formed by sequentially laminating an adhesive layer 202, a heat sink layer 203, a seed layer 204, an orientation control layer 205, an underlayer 31, a magnetic layer 209, and a protective film 210 on a substrate 201 from the lower side.

The thermally assisted magnetic recording medium shown in FIG. 2 is the same as the thermally assisted magnetic recording medium 1 shown in FIG. 1 except that the heat sink layer 203 and the adhesive layer 202 which bonds the heat sink layer 203 and the substrate 201 are formed between the substrate 201 and the seed layer 204. Therefore, only the members different from those in the example shown in FIG. 1 will be described and the description of the same members as those in the example shown in FIG. 1 will not be repeated.

In the thermally assisted magnetic recording medium, the magnetic recording medium is heated by a laser to perform recording. Therefore, it is necessary to rapidly dissipate heat, which remains in the magnetic layer 209 after recording, to suppress the spreading of a heating spot. It is possible to reduce the width of a magnetization transition region and the noise of the medium by rapidly cooling the magnetic layer 209 after recording.

It is preferable to provide the heat sink layer 203 in the thermally assisted magnetic recording medium in order to rapidly cool the magnetic layer 209 after recording. The heat sink layer 203 can be made of a metal material with high thermal conductivity, such as Ag, Cu, Al, or Au, or an alloy having them as main components.

The adhesive layer 202 is not particularly limited as long as it can closely bond the heat sink layer 203 and the substrate 201 and can be appropriately determined depending on the material forming the heat sink layer 203. It is preferable that the adhesive layer 202 be made of, for example, NiTa when the heat sink layer 203 is made of Cu or Cu alloy.

In the thermally assisted magnetic recording medium shown in FIG. 2, the heat sink layer 203 and the adhesive layer 202 are arranged between the substrate 201 and the seed layer 204. The arrangement position of the heat sink layer 203 and the adhesive layer 202 is not limited to a space between the substrate 201 and the seed layer 204. For example, when the seed layer 204 is not provided in the thermally assisted magnetic recording medium, the heat sink layer 203 and the adhesive layer 202 can be provided between the substrate 201 and the orientation control layer 205.

Since the thermally assisted magnetic recording medium shown in FIG. 2 includes the heat sink layer 203, the heat sink layer 203 can rapidly dissipate heat which remains in the magnetic layer 209 after recording. Therefore, it is possible to further improve the SNR.

[Magnetic Recording and Reproducing Apparatus]

Figure 3:
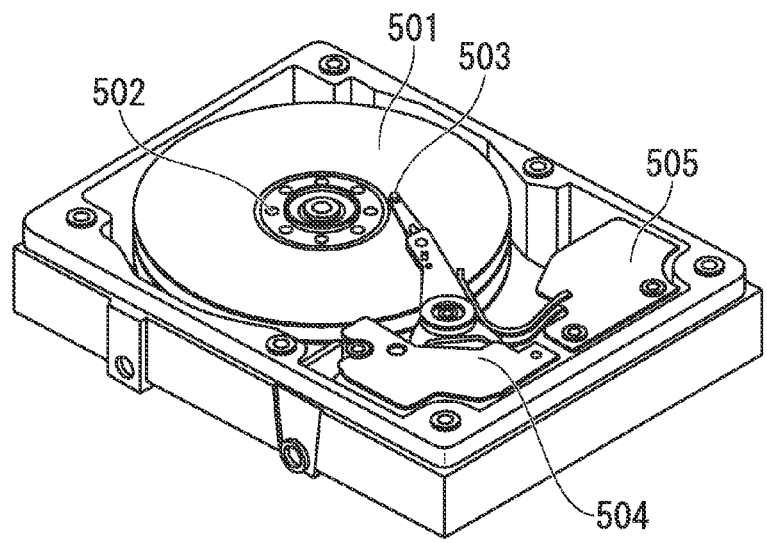
FIG. 3 is a perspective view illustrating an example of a magnetic recording and reproducing apparatus according to the invention.

Next, a magnetic recording and reproducing apparatus according to the invention will be described. FIG. 3 is a perspective view illustrating an example of the magnetic recording and reproducing apparatus according to the invention and FIG. 4 is a cross-sectional view schematically illustrating the structure of a magnetic head provided in the magnetic recording and reproducing apparatus shown in FIG. 3.

The magnetic recording and reproducing apparatus shown in FIG. 3 has a schematic structure including a magnetic recording medium 501 which is the thermally assisted magnetic recording medium according to the invention, a medium driving unit 502 which rotates the magnetic recording medium 501 and drives the magnetic recording medium 501 in a recording direction, a magnetic head 503 which performs a recording operation and a reproducing operation on the magnetic recording medium 501, a head moving unit 504 which moves the magnetic head 503 relative to the magnetic recording medium 501, and a recording and reproducing signal processing system 505 which inputs a signal to the magnetic head 503 and reproduces a signal output from the magnetic head 503.

Figure 4:
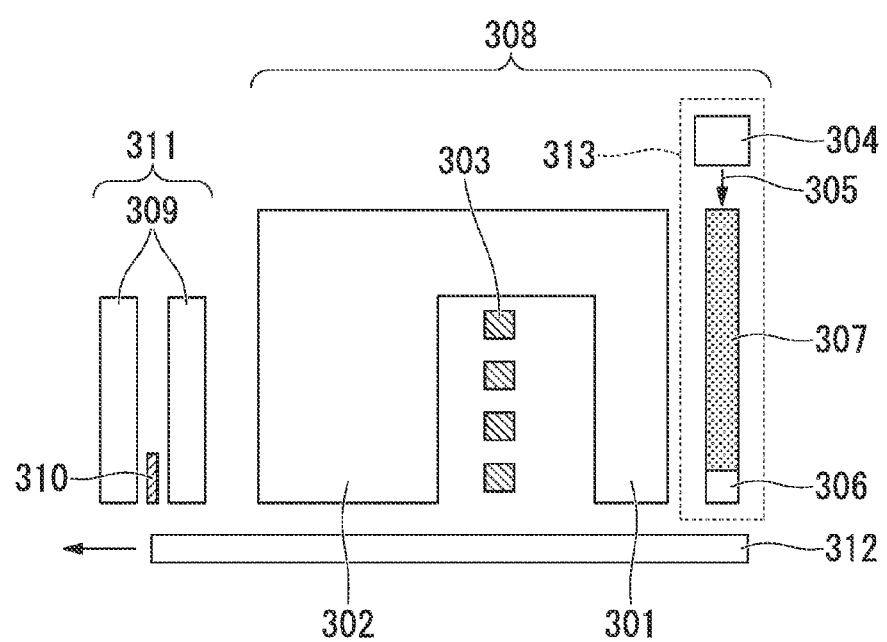
FIG. 4 is a cross-sectional view schematically illustrating the structure of a magnetic head that is provided in the magnetic recording and reproducing apparatus shown in FIG. 3.

The magnetic head 503 provided in the magnetic recording and reproducing apparatus shown in FIG. 3 has a schematic structure including a recording head 308 and a reproducing head 311, as shown in FIG. 4. The recording head 308 includes a main magnetic pole 301, an auxiliary magnetic pole 302, a coil 303 for generating a magnetic field, a laser radiation unit 313, a laser diode (LD) 304 which heats a magnetic recording medium 312, and a waveguide 307 for transmitting a laser beam 305 generated from the LD to a near field generation element 306 which is provided at the leading end. The reproducing head 311 includes a reproducing element 310, such as a TMR element, which is interposed between a pair of shields 309.

In the magnetic recording and reproducing apparatus shown in FIG. 3, near-field light generated from the near field generation element 306 of the magnetic head 503 is radiated to the magnetic recording medium 501 to locally heat the surface of the magnetic recording medium 501, thereby temporally reducing the coercive force of the magnetic layer to a head magnetic field or less. In this way, writing is performed.

The magnetic recording and reproducing apparatus shown in FIG. 3 includes the magnetic recording medium 501 which is the thermally assisted magnetic recording medium according to the invention having a high coercive force, a narrow switching field distribution, and a high SNR. Therefore, the magnetic recording and reproducing apparatus has a low error rate and high reliability.

EXAMPLES

Hereinafter, the effect of the invention will be apparently described with reference to examples. The invention is not limited to the following examples.

Example 1

The thermally assisted magnetic recording medium 1 shown in FIG. 1 was formed by the following method.

That is, the seed layer 102 which had a thickness of 25 nm and was made of Cr-50 at % Ti was formed on the 2.5-inch glass substrate 101 and the substrate was heated at a temperature of 300° C. Then, the orientation control layer 103 which had a thickness of 20 nm and was made of Ru-50 at % Al was formed.

Then, the first underlayer 104 which had a thickness of 15 nm and was made of Mo-30 at % Cr was formed. The second underlayer 105 which had a thickness of 15 nm and was made of ZrC, HfC, TaC, or NbC was formed. The third underlayer 106 which had a thickness of 2 nm and was made of MgO was formed.

Then, the substrate was heated at a temperature of 580° C. The magnetic layer 107 which had a thickness of 8 nm and was made of (Fe-45 at % Pt)-12 mol % ($SiO_2$)-6 mol % BN was formed. The protective film 108, which had a thickness of 3 nm and was made of DLC, was formed on the magnetic layer 107. In this way, magnetic recording media according to Examples 1.1 to 1.4 shown in Table 2 were obtained.

TABLE 2

| | Second underlayer | Third underlayer | $I_{001}/(I_{002} + I_{200})$ | Hc (kOe) | ΔHc/Hc |
|---|---|---|---|---|---|
| Example 1.1 | ZrC | MgO | 2.22 | 41.1 | 0.28 |
| Example 1.2 | HfC | MgO | 2.43 | 39.1 | 0.29 |
| Example 1.3 | TaC | MgO | 2.12 | 38.8 | 0.22 |
| Example 1.4 | NbC | MgO | 2.38 | 42.4 | 0.26 |
| Comparative Example 1.1 | ZrC | — | 1.69 | 22.5 | 0.38 |
| Comparative Example 1.2 | HfC | — | 1.75 | 21.1 | 0.37 |
| Comparative Example 1.3 | TaC | — | 1.54 | 18.8 | 0.33 |
| Comparative Example 1.4 | NbC | — | 1.62 | 24.1 | 0.35 |

As comparative examples, the third underlayer was not formed and the magnetic layer was directly formed on the second underlayer. In this way, magnetic recording media according to Comparative Examples 1.1 to 1.4 shown in Table 2 were obtained.

X-ray diffraction measurement was performed on the media according to Examples 1.1 to 1.4. As a result, a (100) diffraction peak and a weak (200) diffraction peak were observed from RuAl of the orientation control layer. In addition, only the (200) diffraction peak was observed from the first underlayer and the second underlayer. Here, the lattice constant of the first underlayer (Mo-30 at % Cr) which was estimated from a diffraction peak position was 0.310 nm. An $L1_0$-FePt (001) peak and a mixture peak of an $L1_0$-FePt (002) peak and an FCC-FePt (200) peak were observed from the magnetic layer. Since the third underlayer (MgO underlayer)

has a small thickness of 2 nm, a clear diffraction peak does not appear. It is considered that the third underlayer has the (100) orientation because the magnetic layer has the above-mentioned orientation. In addition, since a clear diffraction peak does not appear from the CrTi seed layer, the seed layer has an amorphous structure.

Table 2 shows the ratio $I_{001}/(I_{002}+I_{200})$ of $L1_0$-FePt (001) peak intensity $I_{001}$ to the mixture peak intensity $(I_{002}+I_{200})$ of the $L1_0$-FePt (002) peak and the FFCC-FePt (200) peak, coercive force Hc, and a coercive force dispersion ΔHc/Hc which is normalized with the coercive force.

Here, Hc was calculated from a magnetization curve which was obtained by applying a magnetic field of 7T using a superconducting quantum interference element (SUQID) and measuring magnetization at room temperature. In addition, ΔHc/Hc was measured by the method disclosed in "IEEE Trans. Magn., Vol. 27, pp. 4975-4977, 1991".

Specifically, in a major loop and a minor loop obtained by applying a maximum magnetic field of 7T and measuring magnetization at room temperature, the magnetic field, when a magnetization value was 50% of a saturation value, was measured and ΔHc/Hc was calculated from the difference between the values on the assumption that the Hc distribution was a Gaussian distribution. ΔHc/Hc is a parameter corresponding to the switching field distribution. As the value of ΔHc/Hc is reduced, a higher medium SNR is obtained, which is preferable.

As can be seen from Table 2, in all of Examples 1.1 to 1.4, the ratio $I_{001}/(I_{002}+I_{200})$ has a large value of 2.1 or more and the degree of order of the $L1_0$-FePt alloy in the magnetic layer is high. In addition, in Examples 1.1 to 1.4, Hc has a large value of 38 kOe or more and ΔHc/Hc has a small value of 0.3 or less.

Among the above-mentioned examples, in particular, in Example 1.1 in which the second underlayer was made of ZrC and Example 1.4 in which the second underlayer was made of NbC, Hc was high. It is considered that this is because the ratio $I_{001}/(I_{002}+I_{200})$ is particularly high in Examples 1.1 and 1.4 and the regularity is very high.

In particular, in Example 1.3 in which the second underlayer was made of TaC, ΔHc/Hc was low.

This shows that, when TaC is used to form the second underlayer, the switching field distribution can be particularly reduced.

In contrast, in Comparative Examples 1.1 to 1.4 in which the third underlayer was not formed, the ratio $I_{001}/(I_{002}+I_{200})$ was a small value of 1.8 or less, the coercive force was a very small value of 25 kOe or less, and ΔHc/Hc was a large value of 0.33 or more.

As can be seen from the above, when the magnetic layer was formed on a laminated underlayer of the first underlayer made of Mo-30 at % Cr, the second underlayer made of ZrC, HfC, TaC, or NbC, and the third underlayer made of MgO, a medium in which the $L1_0$-FePt alloy in the magnetic layer had a high degree of order and which had high Hc and low ΔHc/Hc was obtained.

Example 2

The thermally assisted magnetic recording medium shown in FIG. 2 was formed by the following method.

That is, the adhesive layer 202 which had a thickness of 5 nm and was made of Ni-35 at % Ta, the heat sink layer 203 which had a thickness of 50 nm and was made of Cu-0.5 at % Zr, and the seed layer 204 which had a thickness of 5 nm and was made of Cr-50 at % Ti were formed on the 2.5-inch glass substrate 201 and the substrate was heated at a temperature of 250° C. Then, the orientation control layer 205 which had a thickness of 20 nm and was made of Cr-5 at % Mn was formed.

Then, the first underlayer 206 which had a thickness of 10 nm and was made of W was formed. The second underlayer 207 which had a thickness of 8 nm and was made of ZrC, HfC, TaC, or NbC was formed. The third underlayer 208 which had a thickness of 3 nm and was made of MgO was formed.

Then, the substrate was heated at a temperature of 600° C. The magnetic layer 209 which had a thickness of 12 nm and was made of (Fe-45 at % Pt) −30% C was formed. The protective film 210 which had a thickness of 3.2 nm and was made of DLC was formed. In this way, magnetic recording media according to Examples 2.1 to 2.4 shown in Table 3 were obtained.

TABLE 3

|  | Second underlayer | SNR (dB) | OW (dB) |
| --- | --- | --- | --- |
| Example 2.1 | ZrC | 15.5 | 35.6 |
| Example 2.2 | HfC | 15.8 | 30.5 |
| Example 2.3 | TaC | 16.5 | 33.3 |
| Example 2.4 | NbC | 15.2 | 32.1 |
| Comparative Example 2.1 | — | 12.2 | 25.5 |

As a comparative example, a medium in which the second underlayer was not formed and the third underlayer was formed on the first underlayer was manufactured and a magnetic recording medium according to Comparative Example 2.1 shown in Table 3 was obtained.

A perfluoropolyether-based lubricant was applied onto the media according to Examples 2.1 to 2.4 and Comparative Example 2.1 and RW characteristics were evaluated using the magnetic head shown in FIG. 4.

Table 3 shows the SNR of the medium measured by recording an all-one pattern signal with a linear recording density of 1500 kFCI using the magnetic head shown in FIG. 4 and overwriting characteristics OW. Here, power which was supplied to the laser diode was adjusted such that a track width MWW which was defined as the half width of a track profile was 60 nm.

As shown in Table 3, all of Examples 2.1 to 2.4 had a high SNR of 15 dB or more and a high overwriting characteristic of 30 dB or more. In particular, Example 2.1 in which the second underlayer was made of ZrC had a high overwriting characteristic of 35 dB or more. In addition, Example 2.3 in which the second underlayer was made of TaC had a high SNR of 16 dB or more.

In contrast, in Comparative Example 2.1, the SNR and the overwriting characteristics were significantly less than those in Examples 2.1 to 2.4.

As can be seen from the above, when the second underlayer made of ZrC, HfC, TaC, or NbC was formed between the first underlayer and MgO, a thermally assisted magnetic recording medium which had a high SNR and good overwriting characteristics was obtained.

The corrosion resistance of the media according to Examples 2.1 to 2.4 and Comparative Example 2.1 was evaluated as follows.

First, the number of particles on the entire surface of the medium was measured by using OSA-6300 manufactured by Candela Corporation. Then, the medium was put into a high-temperature furnace with a constant temperature of 90° C. and a constant humidity of 90% and was left for 48 hours. Then, the medium was taken out of the high-temperature furnace and the number of particles was measured again by OSA-6300 manufactured by using Candela Corporation. Table 4 shows the number of particles before and after the medium is put into the high-temperature furnace.

TABLE 4

| | Second underlayer | Number of particles (before medium is put into high-temperature furnace) | Number of particles (after medium is put into high-temperature furnace) |
|---|---|---|---|
| Example 2.1 | ZrC | 88 | 91 |
| Example 2.2 | HfC | 101 | 111 |
| Example 2.3 | TaC | 43 | 47 |
| Example 2.4 | NbC | 71 | 79 |
| Comparative Example 2.1 | — | 55 | 891 |

In Examples 2.1 to 2.4, the number of particles was substantially the same before and after the medium was put into the high-temperature furnace. In contrast, in Comparative Example 2.1, the number of particles increased significantly before and after the medium was put into the high-temperature furnace.

In addition, the surface of the medium was observed by an optical microscope. As a result, particles with a size of several micrometers to several tens of micrometers were observed in Comparative Example 2.1. This shows that, since the medium was left for a long period of time under the conditions of a high temperature and a high humidity, a large number of corrosion grains are generated on the surface of the medium.

In contrast, in Examples 2.1 to 2.4, particles with a size of several micrometers to several tens of micrometers were not observed. In addition, in Example 2.3 in which the second underlayer was made of TaC, particularly, the number of particles was small.

As can be seen from the above, when the second underlayer is made of ZrC, HfC, TaC, or NbC, the SNR and overwriting characteristics of the medium are improved and the corrosion resistance thereof is significantly improved.

Example 3

Similarly to Example 2, the thermally assisted magnetic recording medium shown in FIG. 2 was formed by the following method.

The first underlayers which had a thickness of 20 nm and were made of Mo, Mo-30 at % Cr, Mo-20 at % V, W, W-50 at % Cr, W-30 at % V, W-20 at % Ta, V, Ta, Ta-50 at % W, Nb, and Nb-30 at % Mo were formed. The second underlayer which had a thickness of 5 nm and was made of TaC was formed. The structure of the layer other than the first underlayer and the second underlayer and a deposition process were the same as those in Example 2. In this way, magnetic recording media according to Examples 3.1 to 3.12 shown in Table 5 were obtained.

TABLE 5

| | First underlayer | Lattice constant (nm) | Hc (kOe) | ΔHc/Hc |
|---|---|---|---|---|
| Example 3.1 | Mo | 0.3147 | 36.3 | 0.23 |
| Example 3.2 | Mo-30 at % Cr | 0.3068 | 38.3 | 0.27 |
| Example 3.3 | Mo-20 at % V | 0.3122 | 36.6 | 0.23 |
| Example 3.4 | W | 0.3165 | 37.8 | 0.24 |
| Example 3.5 | W-50 at % Cr | 0.3025 | 35.2 | 0.27 |
| Example 3.6 | W-30 at % V | 0.3122 | 37.7 | 0.23 |
| Example 3.7 | W-20 at % Ta | 0.3192 | 38.1 | 0.22 |
| Example 3.8 | V | 0.3023 | 36.7 | 0.25 |
| Example 3.9 | Ta | 0.3298 | 37.1 | 0.29 |
| Example 3.10 | Ta-50 at % W | 0.3232 | 37.9 | 0.27 |
| Example 3.11 | Nb | 0.3307 | 38.2 | 0.29 |
| Example 3.12 | Nb-30 at % Mo | 0.3227 | 34.4 | 0.29 |
| Comparative Example 3.1 | Cr-50 at % V | 0.2954 | 22.1 | 0.35 |
| Comparative Example 3.2 | Cr-30 at % Mo | 0.2963 | 26.1 | 0.37 |
| Comparative Example 3.3 | Cr-30 at % W | 0.2968 | 25.5 | 0.33 |

As comparative examples, media in which the first underlayers had a thickness of 20 nm and were made of Cr-50 at % V, Cr-30 at % Mo, and Cr-30 at % W were manufactured and magnetic recording media according to Comparative Examples 3.1 to 3.3 shown in Table 5 were obtained.

Figure 5:
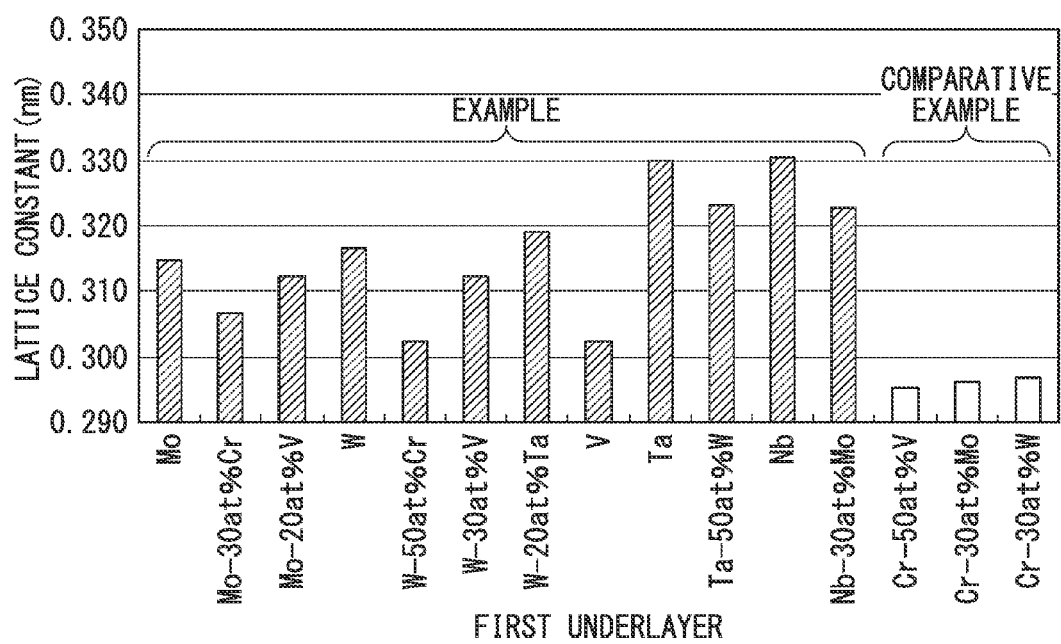
FIG. 5 is a graph illustrating a lattice constant of a first underlayer used in the thermally assisted magnetic recording medium.

The lattice constants of the first underlayers used in Examples 3.1 to 3.12 and Comparative Examples 3.1 to 3.3 were calculated from Vegard's law. The measurement results are shown in FIG. 5. Here, the lattice constants of Cr, V, Mo, W, Ta, and Nb were 0.2884 nm, 0.3023 nm, 0.3147 nm, 0.3165 nm, 0.3298 nm, and 0.3307 nm, respectively. The lattice constant of the alloy used to form the first underlayer can be calculated by Vegard's law since the complete solid solubility or solid solubility limit thereof is in a wide range. FIG. 5 is a graph illustrating the lattice constants of the first underlayers used in the thermally assisted magnetic recording medium.

As shown in FIG. 5, the lattice constant of each of the first underlayers used in Examples 3.1 to 3.12 was 0.302 to 0.332 nm. In contrast, the lattice constant of each of the first underlayers used in Comparative Examples 3.1 to 3.3 was equal to or less than 0.300 nm.

Table 5 shows a coercive force Hc and a normalized dispersion of coercive force ΔHc/Hc in Examples 3.1 to 3.12 and Comparative Examples 3.1 to 3.3. In addition, the coercive force Hc and the normalized dispersion of coercive force ΔHc/Hc were calculated by the same method as that in Example 1.

All of Examples 3.1 to 3.12 have a high coercive force Hc of 34 kOe or more and a low normalized dispersion of coercive force ΔHc/Hc of 0.29 or less. In addition, among Examples 3.1 to 3.12, particularly, Examples 3.1, 3.3, 3.4, 3.6, and 3.7 in which the lattice constant was 0.31 to 0.32 nm had a low normalized dispersion of coercive force ΔHc/Hc.

In contrast, all of Comparative Examples 3.1 to 3.3 had a low coercive force Hc of 27 kOe or less and a high normalized dispersion of coercive force ΔHc/Hc of 0.33 or more.

As can be seen from the above, when the first underlayer was made of a BCC alloy with a lattice constant that was 0.302 to 0.332 nm, a medium which had a high coercive force Hc and a low normalized dispersion of coercive force ΔHc/Hc, that is, a narrow switching field distribution was obtained.

Example 4

The media according to Examples 3.1 to 3.12 and Comparative Examples 3.1 to 3.3 were used as the magnetic recording medium of the magnetic recording and reproducing apparatus shown in FIG. 3 and an error rate was measured.

Recording was performed under the conditions of a linear recording density of 1600 kFCI and a track density of 480 kFCI (a surface recording density of 770 Gbit/inch$^2$) to measure the error rate. The measurement results are shown in Table 6.

In Table 6 "–logBER" indicates the logarithm expression of a bit error rate.

TABLE 6

|  | First underlayer | Error rate-LogBER |
|---|---|---|
| Example 3.1 | Mo | 7.7 |
| Example 3.2 | Mo-30 at % Cr | 7.5 |
| Example 3.3 | Mo-20 at % V | 7.9 |
| Example 3.4 | W | 7.8 |
| Example 3.5 | W-50 at % Cr | 7.4 |
| Example 3.6 | W-30 at % V | 7.8 |
| Example 3.7 | W-20 at % Ta | 7.9 |
| Example 3.8 | V | 7.1 |
| Example 3.9 | Ta | 7.2 |
| Example 3.10 | Ta-50 at % W | 7.4 |
| Example 3.11 | Nb | 7.3 |
| Example 3.12 | Nb-30 at % Mo | 7.4 |
| Comparative Example 3.1 | Cr-50 at % V | 4.2 |
| Comparative Example 3.2 | Cr-30 at % Mo | 4.1 |
| Comparative Example 3.3 | Cr-30 at % W | 4.4 |

As shown in Table 6, the magnetic recording and reproducing apparatuses using the media according to Examples 3.1 to 3.12 had a low error rate of $1\times10^{-7}$ or less. In particular, the magnetic recording and reproducing apparatuses using the media according to Examples 3.1, 3.3, 3.4, 3.6, and 3.7 in which the lattice constant was equal to or greater than 0.31 nm and equal to or less than 0.32 nm had a low error rate of 7.7 digits or less.

In contrast, the magnetic recording and reproducing apparatuses using the media according to Comparative Examples 3.1 to 3.3 had an error rate of about $1\times10^{-4}$.

As can be seen from the above, when the magnetic recording medium in which the first underlayer was made of an alloy having the BCC structure with a lattice constant that was equal to or greater than 0.302 nm and equal to or less than 0.332 nm, the second underlayer was made of TaC, and the third underlayer was made of MgO was incorporated, a magnetic recording and reproducing apparatus with a low error rate was obtained.

INDUSTRIAL APPLICABILITY

The thermally assisted magnetic recording medium according to the invention includes the magnetic layer having a high (001) orientation and has a high coercive force, a narrow switching field distribution, and a high SNR.

In addition, since the magnetic recording and reproducing apparatus according to the invention includes the thermally assisted magnetic recording medium according to the invention, it has a low error rate and high reliability.

The invention can be appropriately applied to a thermally assisted magnetic recording medium and a magnetic recording and reproducing apparatus.

REFERENCE SIGNS LIST

1: THERMALLY ASSISTED MAGNETIC RECORDING MEDIUM
3: UNDERLAYER
101: SUBSTRATE
102: SEED LAYER
103: ORIENTATION CONTROL LAYER
104: FIRST UNDERLAYER
105: SECOND UNDERLAYER
106: THIRD UNDERLAYER
107: MAGNETIC LAYER
108: PROTECTIVE FILM
201: SUBSTRATE
202: ADHESIVE LAYER
203: HEAT SINK LAYER
204: SEED LAYER
205: ORIENTATION CONTROL LAYER
206: FIRST UNDERLAYER
207: SECOND UNDERLAYER
208: THIRD UNDERLAYER
209: MAGNETIC LAYER
210: PROTECTIVE FILM
301: MAIN MAGNETIC POLE
302: AUXILIARY MAGNETIC POLE
303: COIL
304: LASER DIODE
305: LASER BEAM
306: NEAR FIELD GENERATION ELEMENT
307: WAVEGUIDE
308: RECORDING HEAD
309: SHIELD
310: REPRODUCING ELEMENT
311: REPRODUCING HEAD
501: MAGNETIC RECORDING MEDIUM
502: MEDIUM DRIVING UNIT
503: MAGNETIC HEAD
504: HEAD MOVING UNIT
505: RECORDING AND REPRODUCING SIGNAL PROCESSING SYSTEM

What is claimed is:

1. A thermally assisted magnetic recording medium comprising:
   a substrate;
   an underlayer that is formed above the substrate; and
   a magnetic layer that is formed on the underlayer and contains an alloy having an $L1_0$ structure as a main component,
   wherein the underlayer is formed by continuously laminating a first underlayer having a BCC structure with a lattice constant that is 0.302 to 0.332 nm, a second underlayer that has an NaCl structure including C, and a third underlayer that is composed of MgO.

2. The thermally assisted magnetic recording medium according to claim 1,
   wherein the first underlayer includes at least one of elements which are selected from the group consisting of Mo, W, Nb, and Ta.

3. The thermally assisted magnetic recording medium according to claim 1,
   wherein the first underlayer is composed of one material selected from the group consisting of Mo, W, Nb, and Ta.

4. The thermally assisted magnetic recording medium according to claim 1,
   wherein the second underlayer is composed of one material selected from the group consisting of TaC, NbC, ZrC, and HfC.

5. The thermally assisted magnetic recording medium according to claim 1,
   wherein the second underlayer is composed of TaC or NbC.

6. The thermally assisted magnetic recording medium according to claim 1,
   wherein the magnetic layer has a FePt or CoPt alloy having the $L1_0$ structure as a main component and includes at least one material selected from the group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$ and BN.

7. A magnetic recording and reproducing apparatus comprising:
the thermally assisted magnetic recording medium according to claim 1,
a medium driving unit that drives the magnetic recording medium in a recording direction;
a magnetic head that includes a laser generation unit configured to heat the magnetic recording medium and a waveguide configured to guide a laser beam generated from the laser generation unit to a leading end, and performs a recording operation and a reproducing operation on the magnetic recording medium;
a head moving unit that moves the magnetic head relative to the magnetic recording medium; and
a recording and reproducing signal processing system that inputs a signal to the magnetic head and reproduces a signal output from the magnetic head.

* * * * *